Sept. 22, 1942. D. J. SULLIVAN ET AL 2,296,691
APPARATUS FOR USE IN THE TEMPERING OF GLASS SHEETS
Filed Nov. 17, 1939 3 Sheets-Sheet 1

Inventors
DELMER J. SULLIVAN.
GERALD WHITE.
By Frank Fraser
Attorney

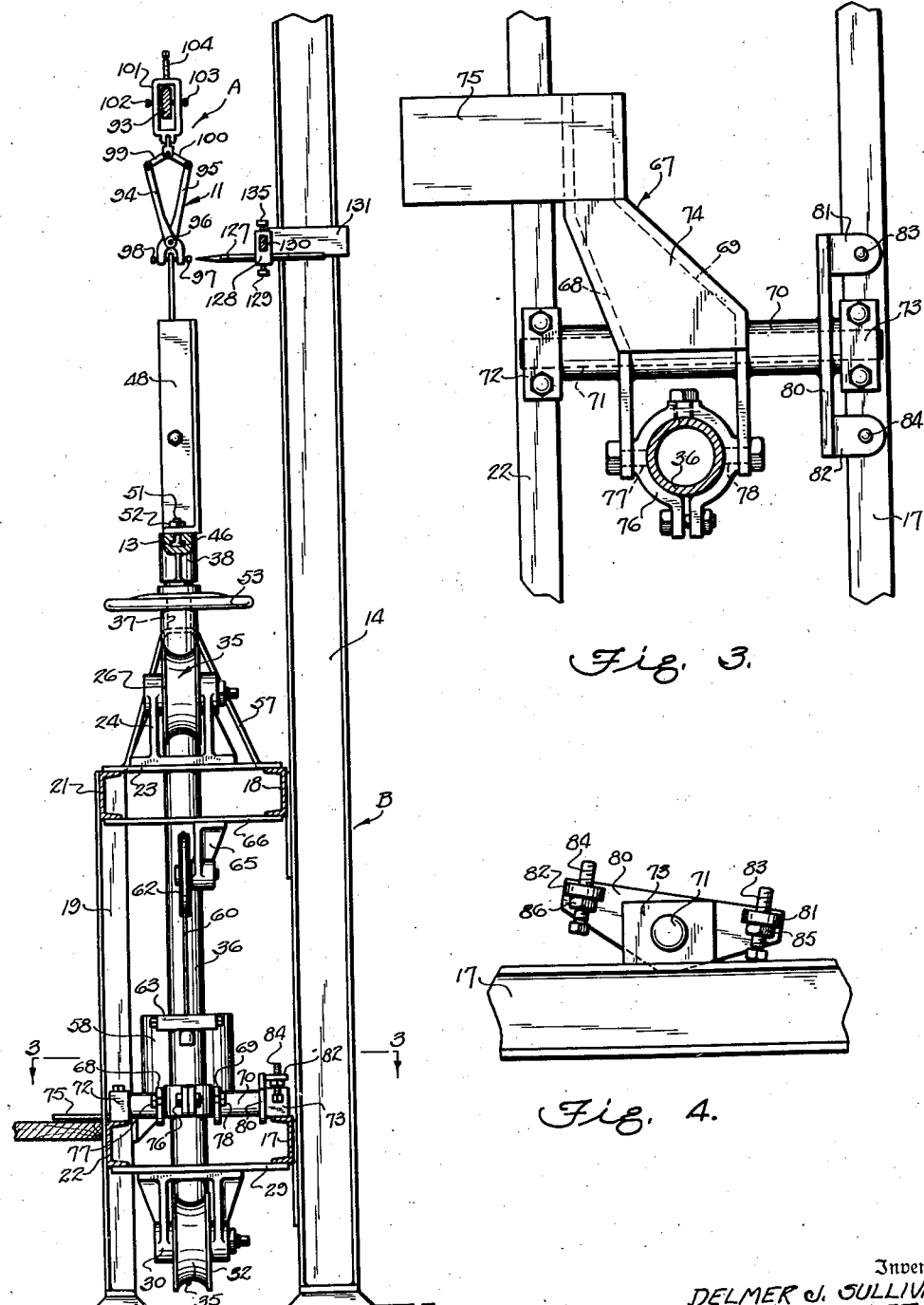

Sept. 22, 1942. D. J. SULLIVAN ET AL 2,296,691
APPARATUS FOR USE IN THE TEMPERING OF GLASS SHEETS
Filed Nov. 17, 1939 3 Sheets-Sheet 3
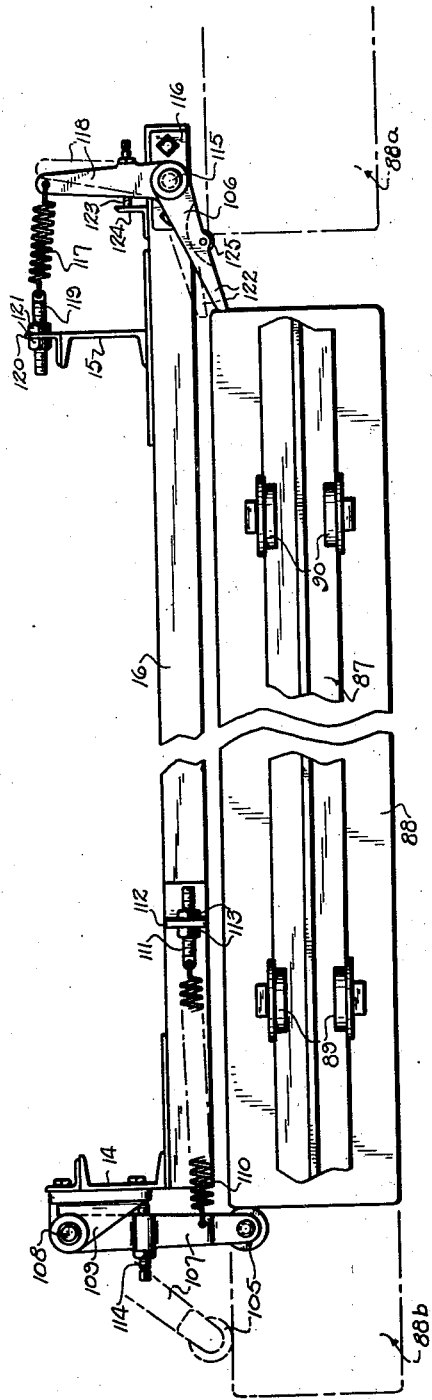
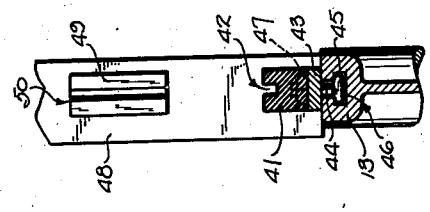
Inventors
DELMER J. SULLIVAN,
GERALD WHITE,
By Frank Fraser
Attorney Patented Sept. 22, 1942

2,296,691

UNITED STATES PATENT OFFICE 2,296,691

APPARATUS FOR USE IN THE TEMPERING OF GLASS SHEETS

Delmer J. Sullivan and Gerald White, Toledo, Ohio, assignors to Libbey-Owens-Ford Glass Company, Toledo, Ohio, a corporation of Ohio Application November 17, 1939, Serial No. 304,968

10 Claims. (Cl. 214—1)

The present invention relates broadly to the tempering of glass and more particularly to an apparatus for use in the tempering of glass sheets according to that process wherein the sheets are supported in a vertical position and subjected while in such position to heating and cooling treatments.

In carrying out such process, the glass sheets are ordinarily suspended in a vertical position by a plurality of relatively small tongs which engage opposite surfaces of the sheets adjacent their upper edges. While thus suspended, the glass sheets are heated to substantially the point of softening of the glass, after which they are suddenly cooled or chilled to effect the tempering thereof. When it is desired to produce bent, tempered glass, the glass sheets subsequent to heating but before being cooled may be bent to the desired curvature by pressing them between a pair of mold members. This bending can also be accomplished while the sheets are vertically suspended.

When tempering glass sheets in the above manner, and especially when the sheets are to be bent, it is very important that the tongs engage the sheets at predetermined points so that the said tongs will not only be properly positioned with respect to the bending molds when the sheets are brought therebetween, but also in order that the sheets will be properly centered between said molds whereby to obtain accurate bending thereof. The proper attachment of the tongs to the glass sheets is of especial importance in the bending of compound curves, since in such cases the centering of the sheets between the bending molds must be extremely accurate.

An important object of this invention is the provision of apparatus for receiving and supporting the glass sheets in a vertical position and for accurately positioning the sheets with respect to the tongs and the tong supporting means whereby to facilitate the attachment of the tongs thereto.

Another important object of the invention is the provision of apparatus of the above character embodying means for indicating the exact points on the glass sheets where the tongs are to be attached.

Another important object of the invention is the provision of apparatus of the above character capable of handling glass sheets of different lengths and widths and including means adjustable to correspond to the different sizes of sheets to assure proper positioning of the sheets with respect to the tongs.

A further important object of the invention is the provision of apparatus of the above character including means for accurately locating the tong supporting means with respect to the glass sheets.

Other objects and advantages of the invention will become more apparent during the course of the following description, when taken in connection with the accompanying drawings.

In the drawings, wherein like numerals are employed to designate like parts throughout the same:

Fig. 2 is a vertical section through the apparatus taken substantially on line 2—2 of Fig. 1;

Fig. 3 is a horizontal section taken substantially on line 3—3 of Fig. 2;

Fig. 4 is a detail view of the means for controlling the raising and lowering movements of the sheet supporting means;

Fig. 5 is a plan view of the tong supporting means and the locating means therefor; and Fig. 6 is a detail section of the sheet supporting means taken substantially on line 6—6 of Fig. 1.

Figure 1:
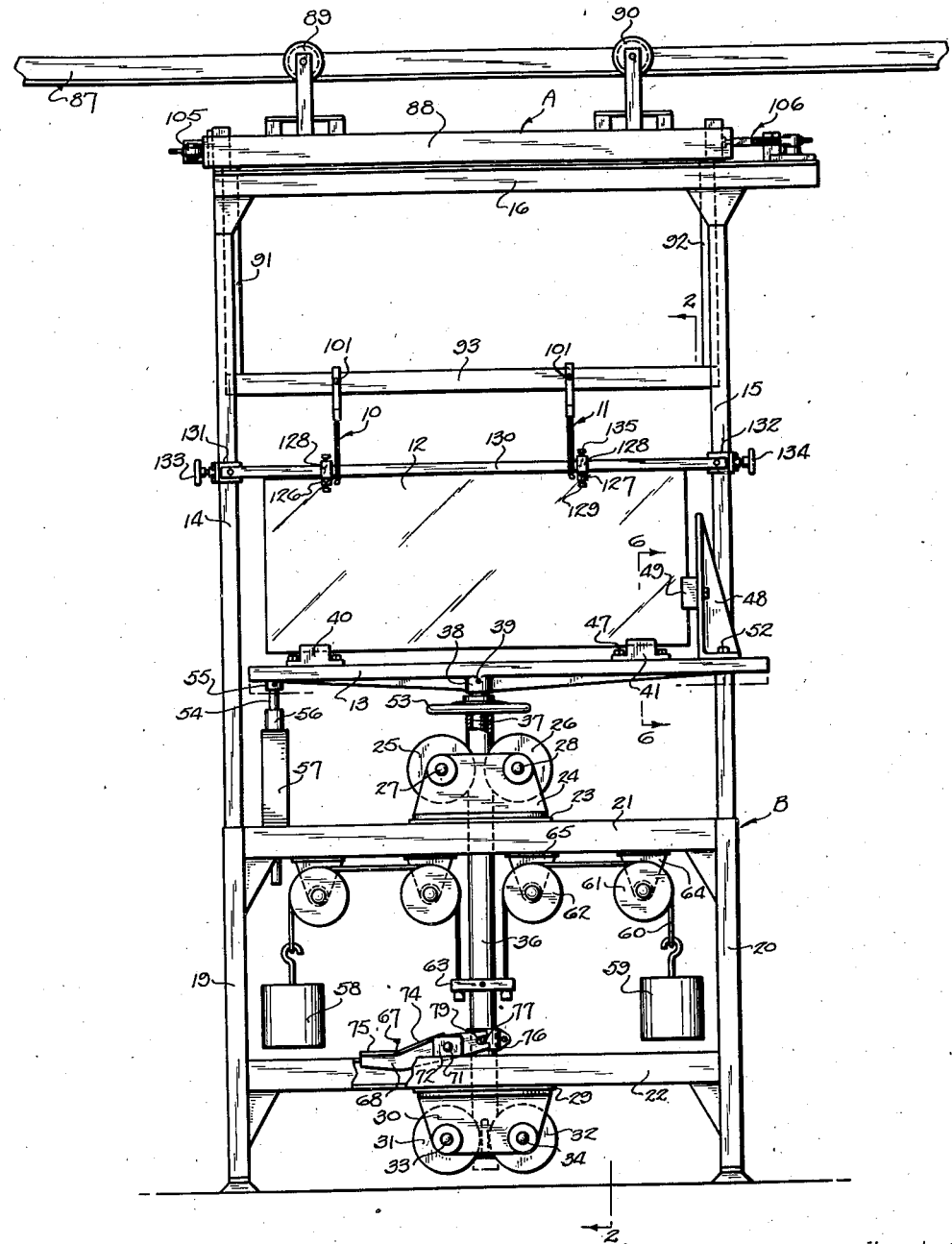
Fig. 1 is a front elevation of apparatus constructed in accordance with the present invention.

With reference now to the drawings, the apparatus comprises generally the tong supporting means designated in its entirety by the letter A and including horizontally spaced tongs 10 and 11 for carrying the glass sheet 12 during the tempering thereof, in combination with sheet supporting means designated in its entirety by the letter B and including a vertically movable table 13 for receiving the glass sheet 12 on edge and for bringing the same into proper position with respect to the tongs 10 and 11 to facilitate the attachment of the tongs thereto.

Referring first to the sheet supporting means B, said means comprises a framework including the spaced vertical relatively long beams 14 and 15 connected together adjacent their upper and lower ends by the transverse channel members 16 and 17 respectively and also intermediate their ends by a channel member 18. Disposed forwardly of and extending parallel with the beams 14 and 15 are the relatively shorter beams 19 and 20 connected together at their upper ends and also adjacent their lower ends by the transverse channel members 21 and 22 which are disposed opposite the channel members 18 and 17 respectively.

Extending between and carried by the channel members 18 and 21 is a horizontal plate 23 upon which is mounted a bracket 24 carrying the horizontally spaced rollers 25 and 26, freely rotatable upon horizontal pins 27 and 28 respectively. Extending between and carried by the channel members 17 and 22 is a plate 29, to the under surface of which is secured a bracket 30 carrying the horizontally spaced rollers 31 and 32 freely rotatable upon horizontal pins 33 and 34. The rollers 25 and 26 are in vertical alignment with rollers 31 and 32 respectively and each of said rollers is peripherally grooved as indicated at 35. Extending vertically between the two pairs of rollers 25—26 and 31—32 and received within the grooves 35 thereof is a tubular sleeve 36.

Received within the upper end of the sleeve 36 is a shaft 37 and secured to the upper end of said shaft is the horizontal sheet supporting table 13, upon which the glass sheet 12 is adapted to be supported on edge. The table 13 preferably consists of a relatively narrow bar provided intermediate its ends with a cylindrical bearing portion 38 within which the upper end of the shaft 37 is received and secured by a screw or the like 39. Carried upon the upper surface of the table are the spaced sheet supporting blocks 40 and 41 provided with grooves 42 (Fig. 6) for receiving the lower edge of the glass sheet 12 therein. Each of the blocks 40 and 41 is preferably formed of rubber, rubber composition or the like and is carried by a metal plate 43 adjustably secured to the table by bolts 44. As best shown in Fig. 6, the heads 45 of bolts 44 are received within the cross portion of an inverted T-shaped channel 46 formed in the upper surface of the table 13 so that upon tightening of the nuts 47 the blocks 40 and 41 will be firmly secured in place. With this arrangement, the blocks can also be adjusted horizontally along the table to accommodate glass sheets of different lengths.

Carried at one end of the table 13 is a vertical bracket 48 and secured thereto is a block 49 having a vertical groove 50 (Fig. 6) for receiving the adjacent side edge of the glass sheet. The bracket 48 is also adjustably carried by the table in the same manner as blocks 40 and 41, being secured thereto by a bolt 51, the head of which is slidably received within the channel 46 in the table and upon the upper end of which is threaded a nut 52. The table 13 is also adapted to be adjustable vertically relative to the sleeve 36 and this is effected by the provision of a hand-wheel 53 which is threaded upon the shaft 37 between the table and the upper end of sleeve 36. Thus, upon rotation of the hand-wheel 53 the shaft 37 will be threaded upwardly or downwardly therethrough to effect the raising or lowering of the table. In order to prevent turning of the table 13, there is carried at one end thereof a depending pin 54 secured at its upper end within a boss 55 on the table and loosely received at its lower end within a collar 56 carried by a bracket 57 mounted upon the channel members 18 and 21.

The table 13 and glass sheet 12 carried thereby are adapted to be manually raised and to facilitate such raising by the operator, the table is preferably counter-balanced by means of weights 58 and 59. Each counterweight is carried at one end of a cable 60 passing upwardly over the pulleys 61 and 62 and secured at its opposite end to a block 63 fixed to the sleeve 36. The pulleys 61 and 62 are carried by brackets 64 and 65 respectively secured upon the underside of a plate 66 carried by the transverse channel members 18 and 21. As will be apparent from Fig. 1, the counterweights 58 and 59 will normally tend to urge the table 13 upwardly to raised position but of course are not sufficient to alone effect such raising. However, they do facilitate the raising of the table by the operator with a minimum amount of effort.

When it is desired to raise the table 13 and thereby move the glass sheet 12 into position to receive the tongs 10 and 11, it is simply necessary to move the sleeve 36 upwardly. This is effected by the operator by pressing downwardly upon a foot-pedal 67 having operative connections with the sleeve 36. The foot-pedal 67 comprises a pair of spaced substantially horizontal arms 68 and 69 carried intermediate their ends by a horizontal sleeve 70 mounted upon a transverse shaft 71. The shaft 71 is supported at its opposite ends in bearings 72 and 73 secured upon the transverse channel members 22 and 17 respectively. Secured upon the outer ends of the arms 68 and 69 are the foot-plates 74 and 75, while the opposite ends of said arms are received at opposite sides of the sleeve 36 (Fig. 3). Clamped around the sleeve 36 adjacent its lower end is a collar 76 and carried by said collar at diametrically opposite points are the horizontal pins 77 and 78. The outer ends of the arms 68 and 69 are bifurcated to provide slots 79 (Fig. 1) for loosely receiving the pins 77 and 78 therein. With this construction, it will be apparent that as the operator steps upon the foot-plate 75 and forces the outer ends of arms 68 and 69 downwardly, the sleeve 70 will be rocked in a counter-clockwise direction upon shaft 71 (Fig. 1) and effect the raising of the sleeve 36 and table 13. Upon release of the foot-pedal by the operator, the table will move downwardly by its own weight.

In accordance with the invention, the upward movement of the table can be accurately controlled so that the glass sheet will be raised just the right amount with relation to the tongs. Likewise, means is also provided for limiting the lowering movement of the table after the tongs have been attached to the sheet. To this end, there is carried at one end of the sleeve 70 a plate 80 formed at its opposite ends with the outwardly projecting horizontal ears 81 and 82 through which pass the vertical bolts 83 and 84 respectively secured by lock nuts 85 and 86. The lower end of bolt 83 is adapted to engage the transverse channel member 17 upon rocking of sleeve 70 in a counter-clockwise direction to limit the upward movement of the table, while the lower end of bolt 84 is adapted to engage said channel member to limit the downward movement of the table upon rocking of said sleeve in the opposite direction. By proper adjustment of the bolts 83 and 84, the table can be raised and lowered just the distance required.

The tong supporting means A comprises a carriage 88 mounted to run along a horizontal monorail 87 disposed above the sheet supporting means B. The carriage 88 is supported by the two pairs of wheels 89 and 90 which run along said monorail. Depending from the carriage at opposite ends thereof are vertical bars 91 and 92, to the lower ends of which is secured the horizontal bar 93 carrying the tongs 10 and 11. The tongs may be of any desired construction but are here shown (Fig. 2) as comprising a pair of upstanding complemental levers 94 and 95 pivotally connected in overlapping relation adjacent their lower ends as at 96. Carried at the lower ends of the levers 94 and 95 are horizontal pins 97 and 98 which are adapted to engage the opposite faces of the glass sheet 12 adjacent the upper edge thereof. The upper ends of the levers 94 and 95 are pivotally connected by links 99 and 100 to the lower end of a yoke 101 which is slidable upon the bar 93. The yoke may be secured to the bar by screws or the like 102 and 103 and vertical adjustment of the yoke relative to the bar may be effected by a screw 104.

In the operation of the apparatus, the tong supporting means A is adapted to be moved along the monorail 87 until it is in the desired position above the sheet supporting means B whereupon the table 13 is adapted to be raised to move the glass sheet 12 supported thereon upwardly into a predetermined position with respect to the tongs 10 and 11 and the said tongs attached thereto. To this end, the invention also contemplates the provision of means for properly locating the tong supporting means A with respect to the sheet supporting means B. Such means is best shown in Fig. 5 and includes a roller 105 engageable by the forward end of the carriage 88 and a pivoted bell-crank lever 106 adapted to engage the rear end of said carriage. When the roller 105 and bell-crank lever 106 are in full line position shown in Fig. 5, with the carriage 88 disposed therebetween, the tong supporting means A is properly located with respect to the sheet supporting means B.

More specifically, the roller 105 is carried at the outer end of a horizontal arm 107 pivoted at its opposite end as at 108 to a bracket 109 which is secured to the upper end of the vertical beam 14. The arm 107 is normally drawn inwardly, to maintain the roller 105 in full line position, by means of a tension spring 110 fastened at one end to said arm and at its opposite end to a screw 111 passing through a plate 112 on channel member 16 and secured by nuts 113. The inward movement of roller 105 is limited by a set screw 114 threaded through arm 107 and engaging bracket 109. The bell-crank lever 106 is pivoted intermediate its ends as at 115 upon a bracket 116 secured to channel member 16. The bell-crank lever is normally urged in a counter-clockwise direction by means of a tension spring 117 fastened at one end to the rear end 118 of said lever and at its opposite end to a screw 119 passing through a plate 120 and secured by nuts 121. By means of the spring 117, the outer end 122 of the bell-crank lever is normally urged forwardly to full line position (Fig. 5) where it is disposed in the path of travel of the carriage 88. The forward movement of the outer end 122 of the lever is controlled by a set screw 123 threaded through said lever and engaging an angle plate 124. Also carried by the outer end 122 of the bell-crank lever is a freely rotatable roller 125 engageable by the forward end of the carriage 88 when said carriage is moved into position above the sheet supporting means.

As brought out above, when the carriage 88 is in the full line position shown in Fig. 5, with the roller 105 engaging the forward end and the bell-crank lever 106 the rear end thereof, the tong supporting means A is properly located above the sheet supporting means B. When the tong supporting means is thus properly located, the operator steps upon the foot-pedal 67 to effect the raising of the table 13 to the full line position shown in Fig. 1. When the table is raised, the glass sheet 12 supported thereon will be moved upwardly into proper relation with respect to the tongs 10 and 11, and while maintained in such raised position, the operator slips the lower ends of the tongs over the upper edge of the sheet 12 and tightens the pins 97 and 98 to firmly grip the sheet therebetween. The table can then be lowered and the carriage 88 moved forwardly along the monorail 16 to carry the glass sheet to the furnace in which it is to be heated prior to being bent and/or tempered.

When the tong supporting means A is moved into position above the sheet supporting means B, the forward end of the carriage initially engages the roller 125 as indicated at 88a (Fig. 5) and upon continued forward movement the carriage will swing the bell-crank lever 106 in a clockwise direction about its pivot 115 to move the outer end 122 of said lever rearwardly into broken line position as the carriage passes by the same. When the forward end of the carriage engages roller 105, the rear end thereof will move beyond the bell-crank lever so that the outer end 122 of said lever will be forced forwardly by the spring 117 to engage the rear end of the carriage. After the tongs have been attached to the glass sheet, the carriage is moved forwardly beyond roller 105, as indicated at 88b, and during the travel of the carriage past the roller, the said roller will ride along the rear side thereof as indicated by the broken lines.

The present invention also includes means for indicating to the operator the exact points on the glass sheet at which the tongs are to be attached. For this purpose, there are provided the forwardly projecting horizontal pointers 126 and 127; each being slidable through a block 128 and secured therein by a set screw 129. The blocks 128 are mounted upon a horizontal bar 130 carried at its opposite ends by brackets 131 and 132 which are slidably mounted upon the vertical beams 14 and 15 respectively and secured thereto by suitable fastening means 133 and 134. The blocks 128 are slidable along the bar 130 to any desired position and are secured in place by set screws 135. Likewise, the supporting bar 130 can be raised or lowered as desired. It will of course be appreciated that in operation the pointers 126 and 127 are first properly located upon the bar 130, depending upon the size of sheet to be tempered as well as upon the curvature to which it is to be bent. Therefore, when the tong supporting means A is moved into proper position above the sheet supporting means B and the glass sheet moved upwardly, the upper edge portion of the sheet will be disposed in front of the pointers 126 and 127 as shown in Fig. 2 and the operator is then adapted to attach the pins 97 and 98 of the tongs to the glass sheet at points which align with the outer ends of the pointers 126 and 127.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for use in the tempering of glass sheets, the combination with a stationary horizontal track and a carriage movable along said track including sheet engaging means for suspending the sheet in a vertical position from its upper edge, of means arranged beneath said track for initially receiving the glass sheet and supporting it at its lower edge in a vertical position, means for raising said sheet supporting means to bring the said sheet into proper position relative to the said carriage whereby to facilitate attachment of said sheet engaging means thereto, and means mounted in a fixed position to one side of the path of vertical movement of said sheet for indicating at which points on the glass sheet the said sheet engaging means are to be attached.

2. In apparatus for use in the tempering of glass sheets, the combination with a stationary horizontal track and a carriage movable along said track including sheet engaging means for suspending the sheet in a vertical position from its upper edge, of means arranged beneath said track for initially receiving the glass sheet and supporting it at its lower edge in a vertical position, means for raising said sheet supporting means to bring the said sheet into proper position relative to the said carriage whereby to facilitate attachment of said sheet engaging means thereto, and fixed pointers independent of said track and carriage for indicating at which points on the glass sheet the said sheet engaging means are to be attached.

3. In apparatus for use in the tempering of glass sheets, the combination with a stationary horizontal track and a carriage movable along said track including sheet engaging means for suspending the sheet in a vertical position from its upper edge, of means arranged beneath said track for initially receiving the glass sheet and supporting it at its lower edge in a vertical position, means for raising said sheet supporting means to bring the said sheet into proper position relative to the said carriage whereby to facilitate attachment of said sheet engaging means thereto, means for limiting the relative vertical movement between the said sheet supporting means and sheet carrying means when they reach a predetermined position with respect to one another, and means mounted in a fixed position to one side of the path of vertical movement of said sheet for indicating at which points on the glass sheet the said sheet engaging means are to be attached.

4. In apparatus for use in the tempering of glass sheets, the combination with a stationary horizontal track and a carriage movable along said track including sheet engaging means for suspending the sheet in a vertical position from its upper edge, of means arranged beneath said track for initially receiving the glass sheet and supporting it at its lower edge in a vertical position, means for raising said sheet supporting means to bring the said sheet into proper position relative to the said carriage whereby to facilitate attachment of said sheet engaging means thereto, means for limiting the relative vertical movement between the said sheet supporting means and sheet carrying means when they reach a predetermined position with respect to one another, and fixed pointers independent of said track and carriage for indicating at which points on the glass sheet the said sheet engaging means are to be attached.

5. In apparatus for use in the tempering of glass sheets, the combination with a stationary horizontal track and a carriage movable along said track including sheet engaging means for suspending the sheet in a vertical position from its upper edge, of means disposed beneath said carriage for initially receiving the glass sheet and supporting it in a vertical position at its lower edge including a vertically movable table, means for moving said table upwardly to bring the said sheet into proper position relative to said carriage whereby to facilitate attachment of said sheet engaging means thereto, and means mounted in a fixed position to one side of the path of vertical movement of said sheet for indicating, when the sheet is in raised position, the points on said sheet where the said sheet engaging means are to be attached.

6. In apparatus for use in the tempering of glass sheets, the combination with a stationary horizontal track and a carriage movable along said track including sheet engaging means for suspending the sheet in a vertical position from its upper edge, of means disposed beneath said carriage for initially receiving the glass sheet and supporting it in a vertical position at its lower edge including a vertically movable table, means for moving said table upwardly to bring the said sheet into proper position relative to said carriage whereby to facilitate attachment of said sheet engaging means thereto, and fixed pointers independent of said track and table for indicating, when the sheet is in raised position, the points on said sheet where the said sheet engaging means are to be attached.

7. In apparatus for use in the tempering of glass sheets, the combination with a stationary horizontal track and a carriage movable along said track including sheet engaging means for suspending the sheet in a vertical position from its upper edge, of means disposed beneath said carriage for initially receiving the glass sheet and supporting it in a vertical position at its lower edge including a vertically movable table, means for moving said table upwardly to bring the said sheet into proper position relative to said carriage whereby to facilitate attachment of said sheet engaging means thereto, means for preventing further upward movement of said sheet supporting means when it reaches a predetermined position with respect to said sheet carrying means, and means mounted in a fixed position to one side of the path of vertical movement of said sheet for indicating the points on the glass sheet where the said sheet engaging means are to be attached.

8. In apparatus for use in the tempering of glass sheets, the combination with a stationary horizontal track and a carriage movable along said track including sheet engaging means for suspending the sheet in a vertical position from its upper edge, of means disposed beneath said carriage for initially receiving the glass sheet and supporting it in a vertical position at its lower edge including a vertically movable table, means for moving said table upwardly to bring the said sheet into proper position relative to said carriage whereby to facilitate attachment of said sheet engaging means thereto, means for preventing further upward movement of said sheet supporting means when it reaches a predetermined position with respect to said sheet carrying means, and fixed pointers independent of said track and table for indicating the points on the glass sheet where the said sheet engaging means are to be attached.

9. In apparatus for use in the tempering of glass sheets, the combination with a stationary horizontal track and a carriage movable along said track including sheet engaging means for suspending the sheet in a vertical position from its upper edge, of means disposed beneath the path of travel of said carriage for initially receiving the glass sheet and supporting it on edge in a vertical position including a stationary frame and a vertically movable table carried thereby, means carried by said frame and engaging said carriage for locating the said carriage in predetermined position above said table, means for moving the said table upwardly to bring the said sheet into proper position relative to the said carriage whereby to facilitate attachment of said sheet engaging means thereto, and means mounted in a fixed position to one side of the path of vertical movement of said sheet for indicating the points on the glass sheet where the said sheet engaging means are to be attached when said sheet is moved to raised position.

10. In apparatus for use in the tempering of glass sheets, the combination with a stationary horizontal track, a carriage movable along said track and a plurality of tongs carried by said carriage and adapted to engage the sheet adjacent its upper edge, of means disposed beneath the path of travel of said carriage for initially receiving the glass sheet and supporting it at its lower edge in a vertical position including a stationary frame and a vertically movable table carried thereby, means carried by said frame and engaging said carriage for locating it in predetermined position above said table, manually operable means for moving the said table upwardly to bring the said sheet into proper position relative to the said carriage whereby to facilitate attachment of said tongs thereto, and fixed pointers carried by said frame for indicating the points on the glass sheet where the said tongs are to be attached.

DELMER J. SULLIVAN.
GERALD WHITE.